(12) United States Patent
Thomas-Alyea et al.

(10) Patent No.: US 9,923,180 B2
(45) Date of Patent: Mar. 20, 2018

(54) SEPARATOR INCLUDING ELECTROACTIVE MATERIAL FOR OVERCHARGE PROTECTION

(75) Inventors: Karen E. Thomas-Alyea, Arlington, MA (US); Susan J. Babinec, Midland, MI (US); Richard K. Holman, Belmont, MA (US)

(73) Assignee: A123 Systems LLC, Waltham, MA (US)

( * ) Notice: Subject to any disclaimer, the term of this patent is extended or adjusted under 35 U.S.C. 154(b) by 0 days.

(21) Appl. No.: 12/131,892

(22) Filed: Jun. 2, 2008

(65) Prior Publication Data

US 2009/0029261 A1 Jan. 29, 2009

Related U.S. Application Data

(60) Provisional application No. 60/941,233, filed on May 31, 2007, provisional application No. 60/941,238, filed on May 31, 2007.

(51) Int. Cl.
*H01M 2/16* (2006.01)
*H01M 4/38* (2006.01)
*H01M 10/42* (2006.01)
*H01M 4/583* (2010.01)
*H01M 10/052* (2010.01)

(52) U.S. Cl.
CPC ......... *H01M 2/166* (2013.01); *H01M 2/1673* (2013.01); *H01M 4/38* (2013.01); *H01M 4/381* (2013.01); *H01M 4/386* (2013.01); *H01M 4/387* (2013.01); *H01M 10/4235* (2013.01); *H01M 4/583* (2013.01); *H01M 10/052* (2013.01)

(58) Field of Classification Search
USPC .......................................................... 429/248
See application file for complete search history.

(56) References Cited

U.S. PATENT DOCUMENTS

| | | | |
|---|---|---|---|
| 5,360,686 A | 11/1994 | Peled et al. | |
| 5,549,981 A | 8/1996 | Maly-Schreiber et al. | |
| 6,203,727 B1 | 3/2001 | Babinec et al. | |
| 6,228,516 B1 | 5/2001 | Denton, III et al. | |
| 7,087,348 B2 | 8/2006 | Holman et al. | |
| 7,160,648 B2 | 1/2007 | Noh et al. | |
| 2002/0160256 A1 | 10/2002 | Kami et al. | |
| 2004/0029010 A1* | 2/2004 | Sada | H01B 1/122 429/231.4 |
| 2005/0084761 A1* | 4/2005 | Hennige et al. | 429/247 |
| 2006/0046138 A1* | 3/2006 | Hennige et al. | 429/142 |
| 2006/0078791 A1 | 4/2006 | Hennige et al. | |

(Continued)

OTHER PUBLICATIONS

Chen, G. and Richardson, T, presented at the 208th meeting of the Electrochemical Society, Los Angeles, CA, Oct. 16-21, 2005, Abstract #88.

(Continued)

*Primary Examiner* — Lucas J. O'Donnell
(74) *Attorney, Agent, or Firm* — McCoy Russell LLP

(57) ABSTRACT

Porous separators for use in electrochemical cells and methods of their manufacture are provided. The separators are porous structures comprising an electroactive material and an electronically insulating structural material, wherein the electroactive material forms a percolating path in the separator.

11 Claims, 2 Drawing Sheets

(56) References Cited

U.S. PATENT DOCUMENTS

2007/0018141 A1 1/2007 Kepler et al.
2011/0123850 A1* 5/2011 Duong ............... H01M 2/1686
                                                          429/145

OTHER PUBLICATIONS

Chen, Gouying and Richardson, Thomas. "Overcharge Protection for Rechargeable Lithium Batteries Using Electroactive Polymers" Electrochemical and Solid-State Letters, 7 (2) A23-A26 (2004).
Chen, Guoying and Richardson, Thomas. "Overcharge Protection for High Voltage Lithium Cells Using Two Electroactive Polymers" Electrochemical and Solid-State Letters, 9 (1) A24-A26 (2006).
International Search Report and Written Opinion, International Application No. PCT/US08/65583, dated Aug. 11, 2008 (12 pages).
Novak et al. "Electrochmically Active Polymers for Rechargeable Batteries" Chem. Rev. 1997, 97 (207-281).
Thomas-Alyea et al. "Modeling the Behavior of Electroactive Polymers for Overcharge Protection of Lithium Batteries", J. Electrochemical Society, (2004) 151, A509-521.
Feng, et al., "Polytriphenylamine Used as an Electroactive Separator Material for Overcharge Protection of rechargeable Lithium Battery", Journal of Power Sources, 161:545-549, 2006 (5 pages).
European Search Report issued for 08756638.6-1227/2151005, dated Jul. 26, 2011 (12 pages).

* cited by examiner

Figure 3
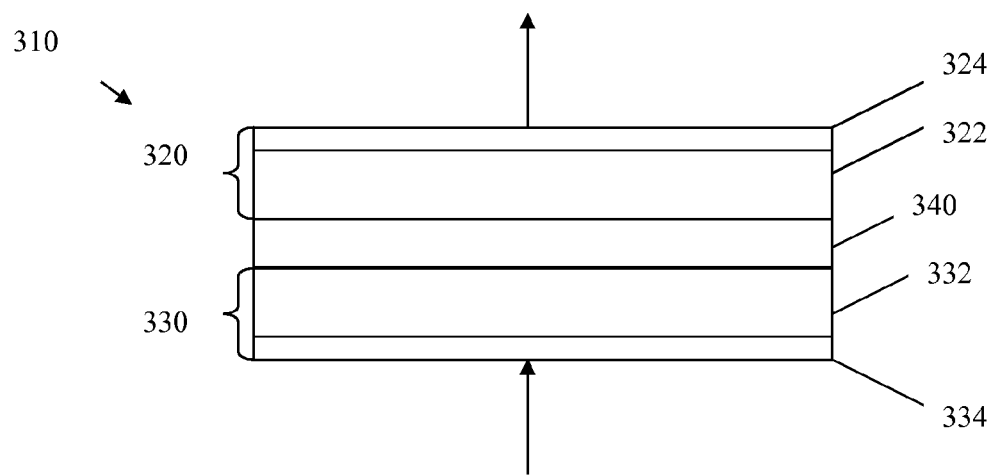
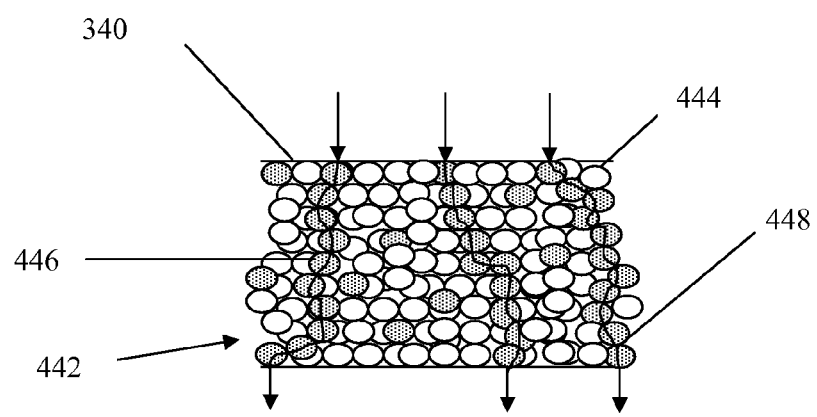
Figure 4

SEPARATOR INCLUDING ELECTROACTIVE MATERIAL FOR OVERCHARGE PROTECTION

This application claims the benefit of U.S. Provisional Application No. 60/941,233, filed May 31, 2007, the entirety of which is incorporated herein by reference, and U.S. Provisional Application No. 60/941,238, filed May 31, 2007, the entirety of which is incorporated herein by reference.

BACKGROUND

This technology relates to electrochemical cells and, more particularly, to battery compositions for improving safety and providing overcharge protection at low cost.

Electrochemical storage batteries of all types are susceptible to damage due to overcharging or overdischarging. Overcharging of an electrochemical storage cell in a battery may be defined as charging beyond a cell's design capacity, or at a rate greater than the cell's ability to accept such charge. The damage to the cell which may occur from such overcharging may include degradation of the electrodes, the current collectors, the electrolyte, the binder and the separators between the electrodes. In addition, internal shorting and gas evolution which may result from such overcharging can result in unstable and even dangerous conditions.

Commonly used methods for overcharge protection and cell balancing include system oversizing, external electronic circuits, redox shuttles, and additives.

Underutilization of capacity provides some protection, but at a considerable cost. External electronic circuits are presently used in most commercial lithium-ion battery packs. External circuits monitor the cell and interrupt the charging process when a condition, such as a certain voltage or temperature, is reached. However, these features add weight, cost and complexity to the cell. If one cell in the string is weaker than the others, then the full charge of the whole string is limited by the weakest cell. To control current and monitor the voltage of every cell in a series-connected string requires massive and expensive amounts of wiring and control boards. Furthermore, external circuits can be accidentally disconnected, rendering them ineffective in safeguarding from overcharge.

"Redox shuttles" have been proposed as an approach to solving the problem of overcharging. This approach employs an electrolyte additive which is inactive under normal conditions, but which oxidizes at the positive electrode when the cell potential exceeds the desired voltage, i.e., when the cell is in an overcharge state. The oxidized form of the shuttle additive diffuses through the cell to the negative electrode where it is reduced to its original (unoxidized) state and then the reduced form of the redox shuttle diffuses through the cell back to the positive electrode to continue the redox cycle. The net effect is an internal shunt which prevents damage to the cell by imposing a limit on cell potential. However, the electrolyte additive's ability to carry useful overcharge currents is limited by its diffusion coefficient, which determines the maximum current that can be carried by the redox shuttle (known as the "limiting current density"). Thus, the redox shuttles are limited to applications where the design charging rate is lower than the shuttle's limiting current density. Furthermore, the limiting current density is highly dependent on temperature. Lastly, the limiting current can be increased by increasing the additive's loading in the electrolyte; however, many potentially suitable additives have low solubility in electrolytes.

Some components increase the cell resistance when the cell reaches overcharge voltages, thereby limiting the current for a power-limited charger. However, these methods have the disadvantage that the weakest cell limits the charging of the entire string. Furthermore, they have limited effectiveness to protect a single weak cell in string of a large number of cells.

Systems have been developed to shut down the cell to prevent catastrophic failure from overcharge. For example, current-interrupt devices (CIDs) interrupt the current upon an increase in pressure in the cell, such as may occur from the presence of additives which generate gas when the cell's potential approaches overcharge conditions. However, the cell is permanently incapacitated once the CID is activated.

Other attempts to prevent overcharge of a battery have been proposed by including an electrolyte composition or additive that significantly increases cell impedance of the cell and thereby protects against catastrophic failure of the cell. In some instances, monomers that react upon overcharge are included in the battery. The monomer can, for example, produce gas that trips a pressure-activated disconnect, and/or produce a polymer that clogs the pores in the cell, increasing cell impedance, and/or produce a polymer that forms an electronic shunt. Polymerization of the monomer generally results in substantially increased impedance of the cell, so the cell is protected against catastrophic failure, but is rendered inoperable for future use in the process.

Previous work has looked at using electroactive polymers for overcharge protection. Application of this approach has been limited by the limited number and especially the cost of electroactive polymers having suitable solubility in the casting solvent.

SUMMARY

The disclosure describes technology that includes an electrochemical cell including an electroactive material that becomes an electronic shunt on overcharge. This electroactive shunt provides a cost-effective method of protection against overcharge and of cell balancing. This electroactive shunt is incorporated into a separator of the electrochemical cell. The separator provides electronic isolation between positive and negative electrodes while allowing ion transport.

In one aspect, the cell employs a composite electroactive separator for overcharge protection, including an inert separator component and an electroactive polymer component. The electroactive polymer is mixed into the separator at a level and with a process that provides a percolating pathway through the composite separator between the positive and negative electrodes. One or more electroactive polymers may be used. The electroactive polymer is electronically insulating within the normal operating voltage window of the electrochemical cell. Upon exposure to potentials above its oxidation potential, however, the electroactive polymer becomes electronically conductive and creates an electronic shunt between the electrodes of the electrochemical cell. In one or more embodiments, the inert separator component comprises a ceramic oxide, a partially or completely halogenated polymer, poly(ethylene oxide), or a mixture of the above, with or without a polyolefin component.

In another aspect, the cell employs a porous solid-state electroactive separator for overcharge protection, which is either constructed primarily of or contains dispersed throughout a material that is an electronic insulator in the normal operating range of voltages, but which experiences a very large increase in conductivity (many orders of magnitude) when the voltage exceeds a threshold value. Upon becoming conductive, the material then allows electronic current to be shunted across the separator, pinning the cell voltage and limiting overcharge. The separator includes one or more solid-state materials with highly non-linear conductivity (in essence switching between on and off states) either embedded in or composing the separator to provide this functionality. The highly non-linearly conducting material (hereinafter "breakdown material") provides a percolating pathway through the composite separator between the positive and negative electrodes. Suitable materials include but are not limited to ceramic varistor materials (e.g., doped $ZnO$, $TiO_2$, SiC, or $SrTiO_3$), p-n/n-p-n/p-n-p junction type materials, and engineered Schottky barrier materials. These materials exhibit a class of behavior in that they are electronic insulators until a particular threshold level of voltage is applied, at which point their conductivity rises exponentially ("breakdown") as the intrinsic potential barrier of the material is overcome. In some embodiments, an additional insulating component is included in the porous separator.

The disclosure provides in one aspect an electrochemical cell, comprising a positive electrode, a negative electrode, and a separator in contact with both the positive electrode and the negative electrode, wherein said separator comprises an inorganic insulating structural component and at least one electroactive polymer, and wherein the electroactive polymer is substantially electronically insulating within an operating cell voltage and is electronically conductive beyond its redox potential.

The disclosure provides in another aspect an electrochemical cell, comprising a positive electrode, a negative electrode, and a separator in contact with both the positive electrode and the negative electrode, wherein said separator comprises an insulating structural component and at least one electroactive material, wherein said electroactive material comprises an electroactive polymer in an association complex with a template polymer, and wherein said electroactive polymer is substantially electronically insulating within an operating cell voltage and is electronically conductive beyond its redox potential.

In one embodiment, the electroactive polymer forms a percolating pathway through the separator. In another embodiment, the electroactive polymer is present in a volume percent of about 1-20%. In another embodiment, the electroactive polymer is present in a volume percent of about 1-10%. In another embodiment, the redox potential of the electroactive polymer coincides with a redox potential of the positive or negative electrode at an upper or lower limit of the operating cell voltage. In another embodiment, the electroactive polymer has an oxidation potential between 3.3 and 4.4 volts versus $Li^+/Li$. In another embodiment, the electroactive polymer has a reduction potential below 0.5 V versus $Li^+/Li$.

In another embodiment, the electroactive polymer comprises an electroactive polymer in an association complex with a template polymer.

In another embodiment, the insulating structural component comprises a ceramic material. In another embodiment, the insulating structural component comprises a porous polymer separator. In some embodiments the polymer separator comprises at least one of polyethylene, polypropylene, polyimide, ethylene-propylene copolymers, and polyethersulfone.

In some embodiments, the electroactive polymer comprises at least one of poly(thiophene), poly(pyrrole), poly(fluorene), poly(phenylene-vinylene), poly(phenylene sulfide), poly(3-alkyl thiophene), poly(dioctyl fluorenyl), poly(aniline), poly(acetylene) and poly(p-phenylene), optionally substituted with at least one of alkyl, aromatic and halogen substituents.

In some embodiments, the template polymer comprises at least one of poly(ethylene oxide), poly(styrenesulfonic acid) (PSSA), PSSA-Li, poly(vinylidene difluoride), poly(methacrylate), poly(methylmethacrylate), poly(acrylic acid), and poly(eythlene-co-ethylene acrylic acid).

In some embodiments, the positive electrode comprises at least one of olivine lithium transition metal phosphate, NASICON lithium transition metal phosphate, spinel structure lithium manganese oxide, and layered $LiMO_2$, wherein M is a mixture of transition metals comprising at least one of Ni, Co, and Mn.

In some embodiments, the negative electrode comprises at least one of lithium, carbon, silicon, aluminum, tin, and lithium titanate.

The disclosure provides in another aspect a method of preparing a separator for an electrochemical cell, comprising providing at least one electrode as a support for a separator; mixing an insulating structural component and at least one electroactive material in a solvent to form a slurry, wherein said electroactive material is at least one of an electroactive polymer and an electroactive polymer precursor, and wherein said electroactive polymer is substantially electronically insulating within a selected voltage window and electronically conductive beyond its redox potential; coating the at least one electrode with the slurry; and removing the solvent.

In one embodiment, the electroactive material comprises an electroactive polymer precursor. In another embodiment, the method further comprises polymerizing the electroactive polymer precursor to yield the electroactive polymer before or after said coating. In some embodiments, the electroactive polymer is insoluble in the solvent.

In another embodiment, the electroactive polymer is in an association complex with a template polymer.

In some embodiments, the slurry further comprises a binder. In some embodiments, the binder component comprises at least one of a fluorinated polymer, a polyvinylidene difluoride polymer or copolymer, latexes, cellulosic polymers, poly(tetrafluoroethylene), polyethylene, polypropylene, poly(ethylene oxide), polystyrene, poly(acrylonitrile), and poly(methylmethacrylate).

The disclosure provides in another aspect a method of operating an electrochemical device, comprising providing an electrochemical device including a positive electrode, a negative electrode, and a separator in contact with both the positive electrode and the negative electrode, wherein said separator comprises an inorganic insulating structural component and at least one electroactive polymer, wherein the electroactive polymer is substantially electronically insulating within an operating cell voltage and is electronically conductive beyond its redox potential; and operating the electrochemical device within a selected voltage window, wherein a percolating pathway through the separator between the positive and negative electrodes is formed when the voltage of the electrochemical device is outside the selected voltage window.

The disclosure provides in another aspect a method of operating an electrochemical device, comprising providing an electrochemical device including a positive electrode, a negative electrode, and a separator in contact with both the positive electrode and the negative electrode, wherein said separator comprises an insulating structural component and at least one electroactive material, wherein said electroactive material comprises an electroactive polymer in an association complex with a template polymer, and wherein said electroactive polymer is substantially electronically insulating within an operating cell voltage and is electronically conductive beyond its redox potential; and operating the electrochemical device within a selected voltage window, wherein a percolating pathway through the separator between the positive and negative electrodes is formed when the voltage of the electrochemical device is outside the selected voltage window.

The disclosure provides in yet another aspect an electrochemical cell, comprising a positive electrode, a negative electrode, and a separator in contact with both the positive electrode and the negative electrode, wherein said separator comprises an insulating structural component and at least one inorganic electroactive material, wherein the inorganic electroactive material is substantially electronically insulating within an operating cell voltage and is non-linearly electronically conductive beyond a threshold voltage.

In some embodiments, the inorganic electroactive material comprises at least one of ceramic varistor materials, including doped $ZnO$, $TiO_2$, $SiC$, and $SrTiO_3$, p-n/n-p-n/p-n-p junction type materials, and engineered Schottky barrier materials.

The disclosure provides in another aspect a method of preparing a separator for an electrochemical cell, comprising providing at least one electrode as a support for a separator; mixing an insulating structural component and at least one inorganic electroactive material in a solvent to form a slurry, wherein said inorganic electroactive material is substantially electronically insulating within an operating cell voltage and is non-linearly electronically conductive beyond a threshold voltage; coating the at least one electrode with the slurry; and removing the solvent.

The disclosure provides in another aspect a method of preparing a separator for an electrochemical cell, comprising providing a porous polymer separator support; providing at least one electroactive material in a solvent, forming a slurry, wherein said electroactive material is at least one of an electroactive polymer in an association complex with a template polymer, and an inorganic electroactive material, wherein said electroactive polymer is substantially electronically insulating within an operating cell voltage and is electronically conductive beyond its redox potential, and wherein the inorganic electroactive material is substantially electronically insulating within an operating cell voltage and is non-linearly electronically conductive beyond a threshold voltage; infusing the porous polymer separator support with the slurry; and removing the solvent.

In some embodiments, the polymer forming the porous separator support is selected from the group consisting of polyethylene, polypropylene, polyimide, ethylene-propylene copolymers, and polyethersulfone.

The disclosure provides in another aspect a method of operating an electrochemical device, comprising providing an electrochemical device including a positive electrode, a negative electrode, and a separator in contact with both the positive electrode and the negative electrode, wherein said separator comprises an insulating structural component and at least one inorganic electroactive material, wherein said inorganic electroactive material is substantially electronically insulating within an operating cell voltage and is non-linearly electronically conductive beyond a threshold voltage; and operating the electrochemical device within a selected voltage window, wherein a percolating pathway through the separator between the positive and negative electrodes is formed when the voltage of the electrochemical device is outside the selected voltage window.

The electroactive separators described herein enable full charge of a cell, and particularly a string of cells, without risk of overcharge. Unlike external protection circuits, the protection mechanism adds no substantial mass or volume to the pack, and it cannot be accidentally disconnected or disabled. Unlike redox shuttles which have low limiting currents, the electroactive shunt can pass charging current as high as the 2 C rate.

Characteristics of the electroactive polymer include insolubility in the battery electrolyte, an oxidation potential above the normal charge potential of the positive electrode and below the potential at which degradation reactions occur in the cell, stability against reduction by the negative electrode for polymers placed adjacent to the negative electrode, resistance to "overoxidization" (where "overoxidization" is defined as oxidation that results in irreversible changes to the polymer), and a conductivity in the oxidized state that is sufficient to shunt the current during charge.

Characteristics of the highly non-linearly conducting material useful in overcharge protection include insolubility in the battery electrolyte, a breakdown potential above the normal charge potential of the positive electrode and below the potential at which degradation reactions occur in the cell, stability against reduction by the negative electrode for polymers placed adjacent to the negative electrode, and a conductivity in breakdown state that is sufficient to shunt the current during charge.

BRIEF DESCRIPTION OF THE DRAWINGS

A more complete appreciation of the present invention and many of its advantages will be understood by reference to the following detailed description when considered in connection with the following drawings, which are presented for the purpose of illustration only are not intended to limit the scope of the appended claims, and in which:

FIG. 3 is a cross-sectional view showing a lithium secondary cell having a solid-state electroactive separator according to one or more embodiments.

FIG. 4 is an enlarged view of a solid-state electroactive separator according to one or more embodiments.

DETAILED DESCRIPTION

Separators including electroactive material for overcharge protection and methods of their manufacture are described. The separators can be used in electrochemical cells to provide a cost-effective method of protection against overcharge and of cell balancing. Electrochemical cells including porous separators that provide for overcharge protection can be cost-effectively produced using a porous separator applied to an electrode as a coat. Insoluble electroactive polymers useful as electrical shunts may be incorporated into a separator coat to provide superior overcharge protection at considerable cost savings. Alternatively, polymers that are soluble in the coat solution but insoluble in the electrochemical cell (electrolyte) may be incorporated into the separator coat. In still other embodiments, soluble polymers may be applied to a traditional porous film separator.

Figure 1:
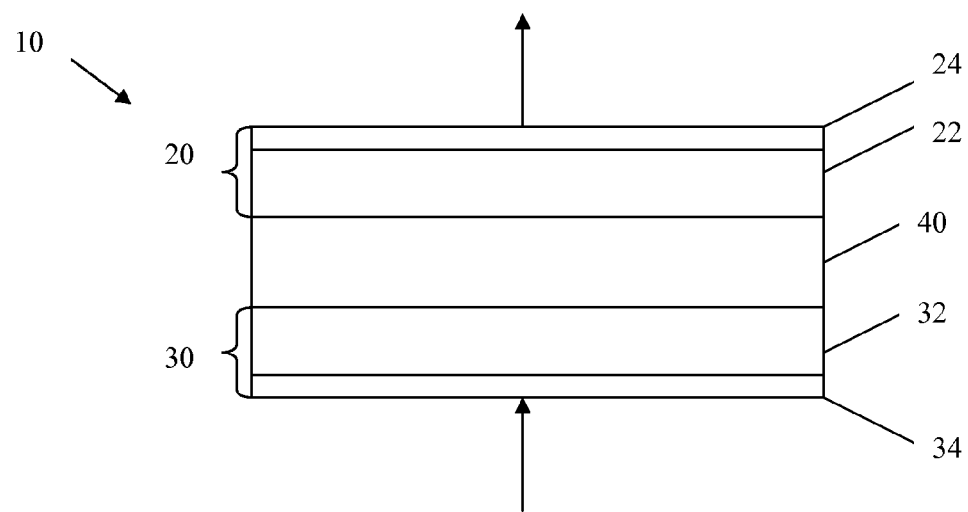
FIG. 1 is a cross-sectional view showing a lithium secondary cell having an electroactive separator according to one or more embodiments.

An electrochemical cell, e.g., a nonaqueous electrolyte secondary battery, including a porous separator for overcharge protection is illustrated in FIG. 1. The cell 10 includes a cathode 20 and an anode 30, which are separated by a composite porous separator 40. The anode 30 includes a layer of anode material 32 coated onto an anode current collector 34 and the cathode 20 includes a layer of cathode material 22 coated onto cathode current collector 24. The cell may have one or more arrangements of anode/separator/cathode in the cell. The cell is housed in a container (not shown) and an electrolytic solution is added to the cell.

Figure 2:
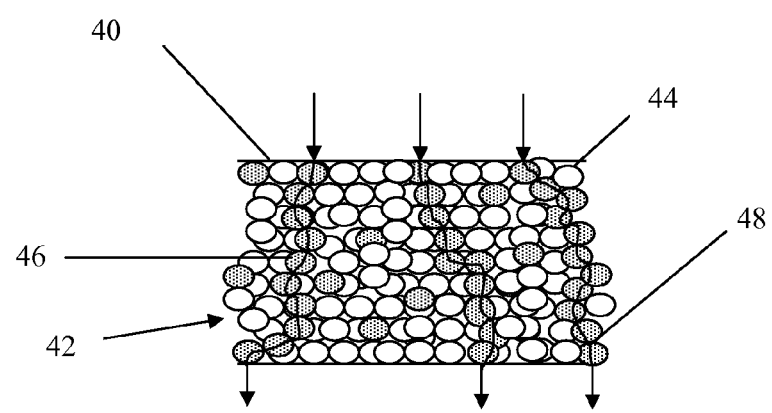
FIG. 2 is an enlarged view of a composite electroactive separator according to one or more embodiments.

One embodiment of the composite electroactive separator is shown in expanded view in FIG. 2. The porous separator 40 includes a porous network 42 of inert electronically insulating material 44 and electroactive polymer 46. The porous network 42 may be made up of particles of electroactive polymer 46 and electronically insulating material 44 that form bridging contacts to develop the porous scaffolding. The electroactive polymer forms a percolating pathway through the separator. Note that the electroactive polymer is depicted as forming particles; however, the polymer can take on any form or shape, including nonspherical particles, irregularly shaped materials and even a coating on the inert particles 44. In use, the network is infused with an electrolyte (not shown) that is ionically conductive. Within the normal operating voltage, ions such as lithium ion can diffuse through the electrolyte; however, both the electrolyte and the porous separator are electronically insulating. At a voltage that is characteristic of the electroactive polymer, the polymer is oxidized and becomes electronically conductive. Current may then flow through the percolating polymer pathway, as is illustrated by arrow 48. This flow forms an electronic shunt that maintains the cell voltage within a desired voltage window.

In one embodiment, a composite electroactive separator is prepared by incorporating the electroactive polymer as a component of a separator coat. The separator is prepared by making a slurry of an inert electronically insulating material that forms the structural support for the porous separator, an electroactive polymer (or precursor thereto), and optionally with a binder, then coating the slurry onto the electrodes, leaving behind a porous, electronically insulating layer that forms the separator. The electroactive polymer (or precursor thereto) is included in the slurry and is thus incorporated into the final separator. The composition (mass ratio and chemical structure) of electroactive polymer, structural insulating material, and binder in the separator is determined by the requirements that the separator be electronically insulating, have small enough pores to prevent electrode particles from shorting through the separator, have high enough porosity and low enough tortuosity to enable rapid transport of lithium ions, have high puncture strength and compressive strength, and be flexible enough to avoid cracking during processing. Any amount of electroactive polymer is possible, however about 1-20 volume % of electroactive polymer may be used, and less than about 10% is most desirable.

In one or more embodiments, the electroactive polymer is electronically insulating within the operating voltage window, but becomes electronically conducting above this window. Conductivity in the oxidized state should be high—in any case, high enough to shunt the current during an overcharge. Exemplary current densities are in the range of 0.1 to 20 mA/cm$^2$. In one or more embodiments, the oxidation potential or reduction potential of the electroactive polymer substantially coincides with the upper limit or lower limit of the electrode's operating potential. For example, the oxidation potential of the polymer may be between 3.6 and 4.4 V vs. Li|Li$^+$. The polymer may be stable at the negative electrode side against reduction, for example, by lithium and lithiated carbon, which are typical negative electrodes in lithium-ion batteries. At the positive electrode side, the polymer may be stable to overoxidation, e.g., oxidation that results in irreversible changes to the polymer. Overoxidation stability may be demonstrated above 0.3 V of its oxidation potential. Exemplary electroactive polymers with convenient voltage windows include poly(thiophene) (3.8 V to 4.8V), poly(pyrrole) (3.3V to 4.3V), poly(fluorene), poly(phenylene-vinylene), polyaniline, poly(phenylene sulfide), polyaniline, polypyrrole, and polyphenylene, any of which may include substituents such as alkyl, aromatic, and/or halogen substituents. Exemplary substituted polymers include poly(3-butyl thiophene) and poly(dioctyl fluorenyl).

In one or more embodiments, the electroactive polymer may have a threshold voltage below the operating voltage window. This requires a polymer to become conductive when reduced, e.g. for use negative electrodes with potentials above about 0.5 V vs. lithium, such as lithium titanate. Exemplary electroactive polymers include poly(acetylene) and poly(p-phenylene).

The structural insulating component of the separator can be made up of any inert material that is electronically insulating and that can provide structural support for the electroactive material and the electrolyte. It can be an organic polymer or a ceramic material. The structural insulating material may be selected from a variety of natural and artificial materials that are compatible with the particular battery systems and chemistry in which the separators are to be incorporated. In one or more embodiments, the inert structural insulating materials form a continuous phase. Exemplary materials may include polymers comprising polypropylene, polyethylene, polyimide, ethylene-propylene copolymers, polyethersulfone, or similar polymers known to those skilled in the art of separators for lithium-ion batteries. Exemplary materials may also include ceramic powders such as ceramic oxides. One particular group of ceramic materials comprises silica, with fumed silica being one specific form of silica which may be employed. Fumed silica is a high surface area, generally high purity silica material. Fumed silica is generally hydrophilic, and a material which has been utilized in the practice of the present invention has a surface area of approximately 200 m$^2$/g. Other silicon compounds may be utilized as a ceramic component of the separators. Another exemplary silicon-based material is polyhedral oligomeric silesquioxane (POSS), which in the context of this disclosure is considered to be a ceramic material. Other ceramic materials include natural and synthetic zeolites, aluminas, titanias, zirconias, magnesias, and the like. The structural insulating materials may be used either singly or in combination. The structural insulating materials can be particles having a particle size of less than about 2 μm, or less than about 0.5 μm or less than about 0.1 μm.

In one or more embodiments, the slurry includes a binder, which is used to hold the structural insulating component and/or the breakdown material together. The binder secures the structural insulating material and/or the breakdown material together to form the porous separator after the solvent is removed. The binder is selected from those polymers which are compatible with the chemistry of a particular battery system. The binder is electronically insulating and chemically stable within the cell within the desired operating temperature range and is also electrochemically stable. One group of polymers having utility in lithium battery systems, as well as other battery systems, comprises fluorinated polymers, particularly polyvinylidene difluoride (PVDF) polymer compositions. There are a variety of such materials known and available in the art, and such materials may comprise essentially homogeneous PVDF as well as blends and copolymers. Exemplary binders include PVDF, copolymers of PVDF and PVDF-hexafluoropropylene (PVDF-HFP), latexes such as styrene-butadiene rubber (SBR) rubbers, cellulosic polymers, poly(tetrafluoroethylene), polyethylene (PE), polypropylene (PP), poly(ethylene oxide) (PEO), polystyrene, poly(acrylonitrile) and poly(methylmethacrylate). Another particular material that has been utilized is a PVDF material sold under the trademark Kureha 7208. Other equivalent and similar materials may likewise be employed.

The proportions of binder and ceramic (or other insulating structural material) may vary over a relatively wide range. In some instances, the ratio of ceramic to binder may range, on a weight basis, from 50:50 to 95:5. In one specific instance, the separator will comprise, on a weight basis, approximately 65% fumed silica and 35% PVDF. In other instances the ratio may be 49:51 to 20:80.

There are several possible ways to incorporate the electroactive polymer into the slurry composition. Levels of binder and structural insulating material are adjusted to accommodate the electroactive polymer.

In one embodiment, a polymer precursor to the electroactive polymer is mixed into the slurry of binder and structural insulating material (e.g., ceramic powder). The polymer precursor can be a monomer or co-monomer, oligomer or other form of precursor that can be converted into the electroactive polymer. The precursor solubility in the slurry may be different from that of the electroactive polymer. A catalyst or suitable initiator or stoichiometric reactant may also be added, if needed, to convert the polymer precursor into the electroactive polymer. The slurry is coated onto one or more electrodes. Polymerization of the monomer is activated before or after the coating. Polymerization can be effected by a catalyst, a reactant such as $FeCl_3$, and/or an intiator such as ultraviolet light or temperature. A subsequent washing step may be used to remove the catalyst or reactant, unused starting materials and/or any by-products.

In another embodiment, the monomer and suitable catalyst, polymerization initiator or reactant, if needed, is mixed with the ceramic powder first. The polymerization is conducted in the presence of the structural insulating material, resulting in a well-mixed composition (blend). The well-mixed composition may include precipitated polymer solids and/or the polymer may coat some or all of the structural insulating material (e.g., ceramic particles). The solids are washed to remove catalyst and/or stoichiometric reactant, and then mixed with the binder to form the slurry. The slurry is coated onto the electrodes to form the separator.

In the embodiment where an oxidant is used to polymerize the monomer, stoichiometric quantities may be used; for example, $FeCl_3$ may be mixed with thiophene monomer with a ratio of 2 $FeCl_3$:1 thiophene.

The solvent system used in the preparation of the slurry may comprise any solvent that is capable of dissolving the binder. Preferably, the solvent should be relatively easy to remove during subsequent processing steps. One solvent that has been found to have utility in connection with PVDF-based membranes comprises N-methylpyrrolidone (NMP), and the NMP may be blended with another solvent such as acetone. One specific solvent mixture utilized in one embodiment comprised, on a volume basis, a 30:70 NMP/acetone mixture. The choice of solvent may affect the morphology of the polymer composite.

The slurry having the dissolved binder and the suspended structural insulating material may for example be spray coated onto at least one surface of an electrode material. Spray coating allows for the rapid, easy to control, and inexpensive coating of the electrode material. The thickness of the layer spray coated onto the electrode will depend upon the particular composition of the coating solution. Coating may be accomplished by spraying one or more coats thereonto. While spray coating has been described, other coating techniques may also be used to prepare the separator. These coating techniques can include printing, screen printing, stenciling, extrusion coating, dip coating, electrostatic coating, ink-jet coating, comma coating, comma reverse coating, slot die coating and roller coating, among others. Other coating techniques may likewise be implemented.

Following the coating, the solvent is removed from the slurry to leave a body of polymer/ceramic particles of the electrode. The solvent may be removed by evaporation, and this evaporation may be fostered by use of heating and/or low pressure conditions. In some instances, the solvent may be extracted by the use of an extraction solvent which is a non-solvent for the polymer. Such techniques are known in the art.

The binders used may be curable polymers, and following the removal of the solvent, the binder may be cured so as to modify or enhance its physical properties. Curing may be accomplished by heating, irradiation, or chemical reaction, as is known in the art.

The result of the foregoing process is the deposition onto the electrode of a porous separator comprised of the binder, electroactive polymer and the structural insulating material. The separator coated electrode may then be incorporated into a battery cell, and the cell may include coatings on either or both of the anode and cathode electrodes.

In another embodiment, two or more electroactive polymers may be used. In one example, different polymers may be incorporated into different regions of the separator. By way of example, one polymer may be incorporated on one face of the separator that faces the positive electrode and another polymer may be incorporated into the other face of the separator that faces the negative electrode. Separators with different compositions and/or properties may be made by varying the composition of the slurry composition during deposition or by applying layers from slurries having different compositions or by coating different slurry compositions onto the anode and cathode. Exemplary polymer combinations include polyaniline/polyphenylene, in which the polyaniline faces the negative (anode) side and the polyphenylene faces the positive (cathode) side. Another exemplary polymer combination is polythiophene/polyfluorene. This embodiment has the advantage of enabling the use of polymers which are stable at one electrode but not at both electrodes. For example, it may enable the use of less expensive polymers, such as polyaniline, which is stable at the negative electrode but not at the positive electrode. It may also increase the operating voltage of the cell, by enabling the use of polymers that have a high oxidation potential (e.g., polyfluorene), which are not stable at the negative electrode. This embodiment may also permit independent optimization of oxidative and reductive stabilities.

Electroactive polymers can be used to provide overcharge protection for electrochemical cells by infusing the electroactive polymer into a porous polymer separator. The electroactive polymer can be coated from solution into the pores of a polyolefin separator (e.g., Celgard). The method requires soluble electroactive polymers for casting into the pores of the separator. This requirement limits the suitable electroactive polymers to those having sufficient solubility to be applied as a polymer solution to the porous polymer separator. In many cases, due to the limited solubility most polymers have in solution, the pores can be only poorly or partially filled, limiting the effectiveness of the electroactive polymer. Soluble electroactive polymers are prohibitively expensive, because of the cost of the reagents and because there is presently no commercial market. For example, 3-butyl thiophene monomer can be polymerized to form chloroform-soluble poly(3-butyl thiophene), whereas thiophene monomer is polymerized to form insoluble polythiophene. Thiophene monomer is relatively cheap, whereas the reagents required to add the alkyl substituent to the thiophene are very expensive.

In contrast, when using a slurry to form a separator as described herein, the requirement of a soluble electroactive polymer is eliminated.

Other embodiments provide alternative methods of incorporating the electroactive polymer into the separator. These alternative methods share the common feature of avoiding the need for expensive solubilizing substituents, while still ensuring that the electroactive polymer is incorporated into the separator such that the electroactive polymer forms a percolating pathway between the positive and negative electrodes, with a morphology that has high electronic conductivity in the oxidized state.

In another embodiment a soluble form of the electroactive polymer may be mixed with the structural insulating material and then dried. This dried mixture can be redispersed in the binder solution (binder and solvent) and then coated onto one or more electrodes. Examples of low cost versions of soluble electroactive binders include those described in, for example, U.S. Pat. No. 6,203,727, entitled "Electronically-Conductive Polymers", which is hereby incorporated by reference.

In still another embodiment, an association complex of an electroactive polymer and a "template polymer" can provide a lower cost method of obtaining soluble electroactive polymers. In such association complexes, the template polymer may be electrochemically inactive. As described, for example, in U.S. Pat. No. 6,203,727, the soluble association complex form of the electroactive polymer can be a "double helix". The association complex can be prepared with any electroactive polymer precursor (e.g., a monomer) and any template polymer as long as there is sufficient interaction to cause the precursor to associate with the host template polymer during synthesis. Association complexes such as the double helix provide intimate mixing, this level of dispersion aids solubility, for example, solubility of the precursor. Specifically, the template polymer may be first dissolved in a suitable solvent at a concentration such that the coil is relatively extended. Next the electroactive polymer precursor (e.g., monomer) is added to this solution. Specific interactions between the monomer and the template result in the monomer nesting in the template polymer coil rather than distributing statistically in the solution. One example would be addition of aniline monomer to a polymeric acid—the proton of the polymer associating highly with the amine nitrogen. A wide range of interactions are possible; however, it is desirable that the interactions are sufficient to gather the polymer precursor from the solution. Next a chemical oxidant is added to this solution and the oxidative polymerization is conducted using conventional procedures and methods.

In the case of polythiophenes, polymerization takes place at about 10° C. and oxidant is added over the course of about 4-6 hours. Once the addition is complete, the solution rests for about 4 hours, or overnight. The product is recovered by addition of a nonsolvent, which induces precipitation. The solid product is washed with copious amounts of a nonsolvent (e.g., an alcohol), which will remove the by-product $FeCl_2$. The product so formed is soluble in the original solvent. Modifications to solubility and conductivity can be accomplished by the addition of further small molecules which also act as dopants, such as Li salts or protons in the case of polyaniline. The nonionic portion of the small molecule dopant is chosen to further adjust the solubility. For example, if solubility in a lower dielectric solvent is desired, a long aliphatic tail is chosen.

Criteria for choosing the electroactive material depend on the application, which may be the switching potential in this instance. The choice of electroactive material determines the overcharge protection potential. For lithium-ion cells with lithium iron phosphate positive electrodes, polythiophene is a suitable electroactive polymer.

Criteria for choosing the polymer template include its native solubility and its stability to the electrodes. In one embodiment, a single polymer has sufficient stability at both the anode and the cathode. In other embodiments, the solution can be obtained by segmenting into a two-stage film having different polymers at each electrode.

In one or more embodiments, the template and the electroactive polymers are stable at a positive potential to a value higher than the usual equilibrium value (e.g., up to 4.2 V). Suitable polymers for this application may include PEO, PSSA-Li (the $Li^+$ form of polystyrenesulfonic acid) and PVDF.

There are at least two processes for incorporating the soluble electroactive polymer formed via association complex into the separator. One process involves the coat separator concept. The second process involves application of the soluble association complex composition into conventional polyolefin separators.

In the first, coat separator process, the association complex containing the electroactive polymer is mixed with electronically insulating structural material, with a binder, and with a solvent that dissolves the association complex and/or the binder, to form a slurry. The slurry is then sprayed or otherwise coated onto the electrodes and the solvent is removed, depositing the electroactive separator onto the electrode. As noted previously, the composition (mass ratio and chemical structure) of electroactive polymer, structural insulating material, and binder in the separator is determined by the requirements that the separator be electronically insulating, have small enough pores to prevent electrode particles from shorting through the separator, have high enough porosity and low enough tortuosity to enable rapid transport of lithium ions, have high puncture strength and compressive strength, and be flexible enough to avoid cracking during processing. Different compositions (choice of electroactive polymer, template polymer, and binder polymer) may be used for the separator facing the anode as from the separator facing the cathode, for reasons already described. Template polymers, such as PEO, more stable against reduction may be used against the negative electrode, whereas template polymers, such as PSSA-Li or PVDF, more stable against oxidation may be used against the positive electrode. Other exemplary template polymers include poly(methacrylate), poly(methylmethacrylate), poly(acrylic acid), and poly(eythlene-co-ethylene acrylic acid). Binder polymers such as polyethylene, polypropylene, and PVDF are more stable against the negative electrode, whereas binder polymers such as PVDF, hexafluoropropylene (HFP), and poly(tetrafluoroethylene) (PTFE) are more stable against the positive electrode.

In the second, conventional polyolefin separator coating process, a solution of the soluble association complex of the electroactive polymer is coated into the pores of a microporous separator. The separator may be a single layer of polypropylene or polyethylene, a triple layer of polypropylene-polyethylene-polypropylene, or similar separators known to those skilled in the art of separators for lithium-ion batteries. Alternatively, the separator may be a multilayer of inorganic particles within and on the surface of a porous film, for example a nonwoven PET film, such as in U.S. Patent Application Nos. 2006/0078791 and 2006/0046138 both of Degussa AG, Dusseldorf. In addition, it is specifically contemplated to use the electroactive polymer in combination with spun and electrospun fibers of polymers, including micro- and nano-polyimide polymer fibers. In this case the electroactive polymer can be coated into the electrically insulating membrane or alternatively it may be included by being part of the polymer composite for a portion, but necessarily not all, of the electrospun fibers, such that these electrospun fibers are electroactive electrospun fibers. The volume fraction of electroactive polymer is chosen to be high enough to provide percolation of electrons across the separator with a conductivity high enough to pass the desired amount of charge current, but low enough so as not to impede transport of lithium ions through the electrolyte in the pores of the separator. A volume fraction (volume electroactive polymer/total separator volume) of 1 to 20% is preferred; more preferably, about 5 to 10%. The solvent used for coating also affects the morphology of the electroactive polymer, which in turn affects its conductivity. Suitable solvents include chloroform, dimethoxy ethane, NMP, acetone and certain alcohols. Methods of coating the pores of the separator include dip-coating, in which the separator is passed through a solution containing the dissolved electroactive polymer; kiss coating, in which the separator skims the surface of the solution; slot-die coating, in which the solution is extruded onto the separator as the separator passes beneath a die; spray coating; and other coating methods. With the kiss coating, slot-die, and some other coating methods, it is possible to use different electroactive polymers and/or template polymers for the anode- and cathode-facing sides of the separator.

Suitable electroactive polymers are stable at the negative electrode and are therefore not reduced to a conductive state at the negative electrode. Suitable electroactive polymers demonstrate an oxidation potential that is greater than the normal potential of full charge of the positive electrode, but lower than the potential at which unwanted side reactions occur on the positive electrode. In other words, the electroactive polymer should be in its neutral, insulating state during normal cell operations. In other embodiments, a suitable electroactive polymer may have a narrow potential window over which it transitions from insulating to conducting. In other embodiments, the electroactive polymer has high electronic conductivity in its oxidized state.

Table 1 lists several electroactive polymers and their oxidation and reduction potentials. The monomers exhibit a range of oxidation and reduction potentials, thereby providing a range of voltage windows for compatibility with most lithium ion systems.

TABLE 1

Approximate Oxidation and Reduction Potentials (in volts) of Electroactive Polymers vs. Li|Li+. (Source: P. Novák, K. Müller, K. S. V. Santhanam, and O. Haas, Chem. Rev. 1997, 97, 207-281, incorporated herein by reference)

| Polymer | Oxidation potential | Over-oxidation potential | Reduction potential |
|---|---|---|---|
| Poly(3-butyl thiophene) | 3.8 | 4.4 | (not reduced) |
| PFO (poly (dioctyl fluorenyl)) | 4.0 | | >0.1 |
| Polyaniline | 3.5 | 4 | |
| Polypyrrole | 3.6 | | |
| Polyphenylene | 3.2 | | 0.2 |

The porous composite electroactive separators described herein may be used in place of other porous separators in any secondary battery. In one or more embodiments, a separator as described herein may be used in place of the microporous separator typically used in a lithium-ion battery.

In one or more embodiments, a nonaqueous electrolyte may be used, which may affect the conductivity and voltage range of the composite separator. The electrolyte may include an appropriate lithium salt dissolved in a nonaqueous solvent. The electrolyte may be infused into the porous separator that spaces apart the positive and negative electrodes. Numerous organic solvents have been proposed as the components of Li-ion battery electrolytes, notably a family of cyclic carbonate esters such as ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. Other solvents proposed as components of Li-ion battery electrolyte solutions include lactones, acetates, ionic liquids, dimethoxyethane, tetrahydrofuran, and 2-methyl tetrahydrofuran. The lithium salt in the electrolyte may include one or more compounds from among $LiClO_4$, $LiPF_6$, $LiBF_4$, $LiSO_3CF_3$, $LiN(SO_2CF_3)_2$, $LiN(SO_2CF_2CF_3)_2$, lithium bis(oxalo borate), and the like. The lithium salt may be at a concentration from 0.5 to 1.5 M.

Examples of positive electrodes include olivine or NASICON-structure (Na superionic conductor) lithium transition-metal phosphates, spinel structure lithium manganese oxide, and layered $LiMO_2$ where M is a mixture of transition metals including Ni, Co, or Mn. Examples of negative electrodes include lithium, carbon, silicon, aluminum, tin, and lithium titanate.

In another aspect of the invention, a solid-state inorganic porous separator can be used for overcharge protection and cost-effectively produced using a porous separator comprising breakdown material applied to an electrode as a coat. In still other embodiments, breakdown material may be applied to a traditional porous film separator.

An electrochemical cell, e.g., a nonaqueous electrolyte secondary battery, including a porous solid-state separator for overcharge protection is illustrated in FIG. 3. The cell 310 includes a cathode 320 and an anode 330, which are separated by a porous solid-state separator 340. The anode 330 includes a layer of anode material 332 coated onto an anode current collector 334 and the cathode 320 includes a layer of cathode material 322 coated onto cathode current collector 324. The cell may have one or more arrangements of anode/separator/cathode in the cell. The cell is housed in a container (not shown) and an electrolytic solution is added to the cell.

The porous solid-state separator is shown in expanded view in FIG. 4. The porous separator 340 includes a porous network 442. The porous network 442 may be made up of breakdown material particles 446 and optionally other electronically insulating material 444 that form bridging contacts to develop the porous structure. The breakdown material 446 forms a percolating pathway through the separator. Note that the breakdown material is depicted as forming substantially spherical particles; however, the breakdown material can take on any form or shape, including nonspherical particles and irregularly shaped materials. In use, the network is infused with an electrolyte (not shown) that is ionically conductive. Within the normal operating voltage, ions such as lithium ion can diffuse through the electrolyte; however, both the electrolyte and the porous separator are electronically insulating. At a voltage that is characteristic of the breakdown material, the material breaks down and becomes electronically conductive. Current may then flow through the percolating pathway, as is illustrated by arrow 448. This flow forms an electronic shunt that maintains the cell voltage within a desired voltage window.

In one embodiment, the porous solid-state separator is prepared by incorporating the breakdown material as a component of a separator coat, for use in a spray or other conventional coating technique as described above. The separator is prepared by making a slurry of an inert electronically insulating material that forms the structural support for the porous separator with a binder and a solvent, then coating the slurry onto the electrodes and removing the solvent leaving behind a porous, electronically insulating layer that forms the separator. The breakdown material is included in the slurry and is thus incorporated into the final separator.

In one or more embodiments, the breakdown material is electronically insulating within the operating voltage window, but becomes electronically conducting above this window. Conductivity in the breakdown state should be high— in any case, high enough to shunt the current during an overcharge. Exemplary current densities are in the range of 0.1 to 10 mA/cm$^2$. In one or more embodiments, the breakdown potential of the breakdown material substantially coincides with the upper limit or lower limit of the electrode's operating potential. For example, the breakdown potential of the breakdown potential may be between 3.6 and 4.4 V vs. Li|Li$^+$. The breakdown material may be stable at the negative electrode side against reduction, for example, by lithium and lithiated carbon, which are typical negative electrodes in lithium-ion batteries. Exemplary breakdown material includes ceramic varistor materials (e.g., doped ZnO, TiO$_2$, SiC, or SrTiO$_3$), p-n/n-p-n/p-n-p junction type materials, and engineered Schottky barrier materials. The breakdown material can be particles having a particle size of less than about 2 µm, or less than about 0.5 µm or less than about 0.1 µm.

In one or more embodiments, the inert structural materials additionally include electronically insulating materials. Exemplary insulating materials include ceramic powders such as a ceramic oxides. Exemplary ceramic oxides include silicas, fumed silicas, and other inert and nonconducting oxides such as ZrO$_2$. Another exemplary silicon-based material is polyhedral oligomeric silesquioxane (POSS), which in the context of this disclosure is considered to be a ceramic material. Other ceramic materials include natural and synthetic zeolites, aluminas, titanias, zirconias, magnesias, and the like. The structural insulating materials may be used either singly or in combination. The structural insulating materials can be particles having a particle size of less than about 2 µm, or less than about 0.5 µm or less than about 0.1 µm.

In one or more embodiments, the slurry includes a binder, which is used to hold the breakdown material together. The binder secures the breakdown material in the porous separator after the solvent is removed. The binder is selected from those polymers which are compatible with the chemistry of a particular battery system. The binder is electronically insulating and chemically stable within the cell within the desired operating temperature range and is also electrochemically stable. One group of polymers having utility in lithium battery systems, as well as other battery systems, comprises fluorinated polymers, particularly polyvinylidene difluoride (PVDF) polymer compositions. There are a variety of such materials known and available in the art, and such materials may comprise essentially homogeneous PVDF as well as blends and copolymers. Exemplary binders include PVDF, copolymers of PVDF and PVDF-hexafluoropropylene (PVDF-HFP), latexes such as styrene-butadiene rubber (SBR) rubbers, cellulosic polymers, poly(tetrafluoroethylene), polyethylene (PE), polypropylene (PP), poly(ethylene oxide) (PEO), polystyrene, poly(acrylonitrile) and poly(methylmethacrylate). PEO is particularly suitable for cells using lithium iron phosphates (doped and undoped) as the positive electrode active material. Another particular material that has been utilized is a PVDF material sold under the trademark Kureha 7208. Other equivalent and similar materials may likewise be employed.

As an example of one embodiment, a polymeric support material (e.g., non-woven mat) is impregnated with a varistor ceramic powder material (e.g., ZnO doped with bismuth), which exhibits a strongly non-linear I-V characteristic. In this material, the breakdown voltage is about 3.2 V per grain boundary, and the total breakdown voltage of a collection of ZnO varistor particles in contact is approximately equal to the sum of the breakdown voltages of all the boundaries in series. Thus, the breakdown voltage of a separator composed of this material would be approximately equal to 3.2 V times the number of particle contacts across the thickness of the separator. If the separator is 2 particles thick, this constitutes 1 boundary, and thus the ideal breakdown voltage would be about 3.2 V, which is too low for typical Li-ion chemistries, but could be implemented in low voltage systems such as LTO. Similarly, a separator thickness of 3 particles results in an ideal separator breakdown voltage of about 6.4 V; in actuality, the potential barrier of the boundaries exhibits a distribution of values, so the actual observed breakdown voltage would be an average with some spread, and would begin at a voltage somewhat lower than 6.4 V.

In one or more embodiments, an average number of grain boundaries in the separator is about 1.5. The breakdown voltage of a particular separator could be tuned for a specific desired separator thickness simply by adjusting the particle size of the varistor material.

In other embodiments, for example, when the breakdown material is a p-n junction or a Schottky barrier, the breakdown voltage can be adjusted by the height of the barrier. The greater the barrier thickness, the higher the breakdown voltage.

The porous solid-state electroactive separators described herein may be used in place of other porous separators in any secondary battery. In one or more embodiments, a solid-state separator as described herein may be used in place of the microporous separator typically used in a lithium-ion battery.

What is claimed is:

1. An electrochemical cell, comprising:
a positive electrode;
a negative electrode; and
a separator in contact with both the positive electrode and the negative electrode,
wherein said separator comprises:
an insulating structural component selected from a group consisting of polymer nonwoven films and polymer fiber mats; and
at least two electroactive materials,
wherein said electroactive materials comprise electroactive polymers in an association complex with a template polymer, wherein each electroactive polymer is substantially electronically insulating within an operating cell voltage and is electronically conductive beyond its redox potential, wherein the electroactive polymers comprise a first electroactive polymer which is incorporated into a face of the separator that faces the positive electrode and a second, different electroactive polymer which is incorporated into a face of the separator that faces the negative electrode, wherein the redox potential of the first electroactive polymer coincides with a redox potential of the positive electrode at an upper or lower limit of the operating cell voltage, and wherein the redox potential of the second electroactive polymer coincides with a redox potential of the negative electrode at an upper or lower limit of the operating cell voltage.

2. The electrochemical cell of claim 1, wherein the electroactive materials form a percolating pathway through the separator.

3. The electrochemical cell of claim 1, wherein the electroactive materials are present in a volume percent of about 1-20%.

4. The electrochemical cell of claim 1, wherein the electroactive materials are present in a volume percent of about 1-10%.

5. The electrochemical cell of claim 1, wherein at least one of the electroactive polymers has an oxidation potential between 3.3 and 4.4 volts versus Li+/Li.

6. The electrochemical cell of claim 1, wherein at least one of the electroactive polymers has a reduction potential below 0.5 V versus Li+/Li.

7. The electrochemical cell of claim 1, wherein at least one of the electroactive polymers comprises at least one of poly(thiophene), poly(pyrrole), poly(fluorene), poly(phenylene-vinylene), poly(phenylene sulfide), poly(3-alkyl thiophene), poly(dioctyl fluorenyl), poly(aniline), poly(acetylene) and poly(p-phenylene), optionally substituted with at least one of alkyl, aromatic and halogen substituents.

8. The electrochemical cell of claim 1, wherein the template polymer comprises at least one of poly(ethylene oxide), poly(styrenesulfonic acid) (PSSA), PSSA-Li, poly(vinylidene difluoride), poly(methacrylate), poly(methylmethacrylate), poly(acrylic acid), and poly(eythlene-coethylene acrylic acid).

9. The electrochemical cell of claim 1, wherein the positive electrode comprises at least one of olivine lithium transition metal phosphate, NASICON lithium transition metal phosphate, spinel structure lithium manganese oxide, and layered LiM02, wherein M is a mixture of transition metals comprising at least one of Ni, Co, and Mn.

10. The electrochemical cell of claim 1, wherein the negative electrode comprises at least one of lithium, carbon, silicon, aluminum, tin, and lithium titanate.

11. The electrochemical cell of claim 1, wherein said insulating structural component is an inorganic particulate insulating structural component.

* * * * *